Nov. 15, 1955 R. B. JOHNSON 2,724,026

CONTROL PANEL

Filed Dec. 10, 1952 4 Sheets-Sheet 1

INVENTOR.
REYNOLD B. JOHNSON

BY Robert W. Bear
ATTORNEY

INVENTOR.
REYNOLD B. JOHNSON
BY Robert B. Bear
ATTORNEY

CONTROL PANEL

Filed Dec. 10, 1952 4 Sheets-Sheet 3

INVENTOR
REYNOLD B. JOHNSON
BY Robert B. Beal
ATTORNEY

United States Patent Office 2,724,026

Patented Nov. 15, 1955

2,724,026

CONTROL PANEL

Reynold B. Johnson, Palo Alto, Calif., assignor to International Business Machines Corporation, New York, N. Y., a corporation of New York Application December 10, 1952, Serial No. 325,179

4 Claims. (Cl. 200—46)

This invention relates to a novel electrical transfer device for accounting machines.

In order to achieve flexibility with electric accounting machines, the various functional components, such as sensing brushes, counters, type bars, and other elements of the machine, are usually permanently wired to a terminal board. The terminal board in turn has hitherto cooperated with a plugboard in order to coordinate the machine then by properly interconnecting these many terminals of elements for any particular job. With a plugboard a frequently complicated series of wiring interconnections must be done by plugging wires into the selected jacks. This is a time-consuming task, and it requires skilled manipulation. It has been the practice, however, to minimize the wiring problem by initially setting up plugboards for often-repeated jobs and by storing these boards away undisturbed when they are not in use. A storage problem results since the boards are bulky. Furthermore, the delicate wiring connections often come loose and disconnected in handling and in storage.

One of the objects of this invention is to provide an equally flexible electrical transfer device as the customary plugboard and at the same time obviate any plugging of wires whatsoever. The only maniplation required according to the present invention in order to shift the operation of the machine from one type of job to another is initially to prepare selected perforations or spaced openings in an insulated sheet. After perforated insulated sheets have been made up for the particular routine jobs required of an accounting machine, an operator can make the shift from one job to another in a few seconds' time by merely removing from the device the insulating sheet or sheets used on a previous job and inserting the proper one(s) in place.

Another object is to provide a simpler, more rugged, and less bulky transfer device than the conventional plugboard. The insulating sheets may be filed and stored as simply as a piece of paper and do not require the delicate handling and the space that a conventional plugboard does. They are not subject to the inadvertent upset of the wiring scheme as frequently happens when plugboards are handled and stored.

Other objects of the invention will be pointed out in the following description and claims and illustrated in the accompanying drawings, which disclose, by way of examples, the principle of the invention and the best mode, which has been contemplated, of applying that principle.

Figure 1:
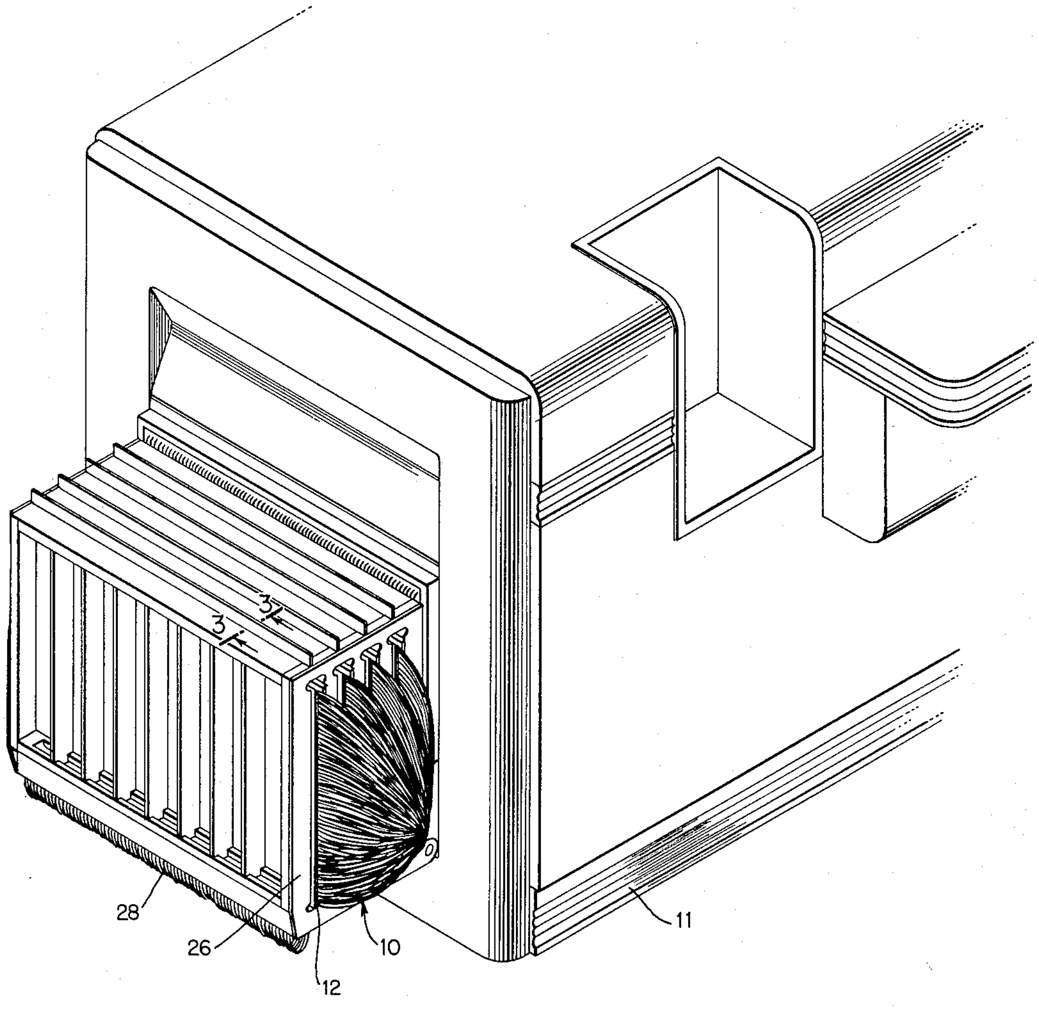
Fig. 1 is an isometric view of one proposed form of an assembled control panel mounted on a conventional electrical accounting machine.

Referring to Fig. 1, the wiring 10 of the various functional elements of the electric accounting machine 11 is brought to a fixed terminal panel 12. Several terminal panels may be provided. For example, one panel may be provided for the terminals of the upper brushes, another panel for the terminals of the lower brushes, a third panel for the terminals of the counters, a fourth panel for the terminals of the type bars, and other panels for the terminals of other functional elements. For purposes of illustration (Fig. 2) four control panels are provided, one panel each for the upper and lower brushes, one panel for the counters, and one panel for the type bars.

The combination of a control panel 12 and its cooperating insulating sheet member 22 and vertical plate 20, to be described later, is called a unit. Each of the eighty linearly extending horizontal terminals or bus bars 14 on the panel of unit II, for example, is respectively the terminal of one of the eighty lower sensing brushes in a conventional well known IBM electric accounting machine. The insulated bus bars 14 are fixed on the face of the panel 12 and extend at regular intervals parallel to one another. Insulated contact points 16 are also provided on the fixed terminal panels 12 in vertical tiers. In this illustrative embodiment of the invention, the number of these vertical tiers of contact points 16 in each horizontal row of contact points equals the number of vertical contact wires 18 in the plate 20, to be described later. There are four such isolated contact points 16 in each vertical tier on the control panel 12 in the present illustration for every vertical wire 18 in each plate 20. Each terminal panel 12 has a vertical plate 20 and an insulating sheet 22 cooperating with it in the operating position.

Figure 6:
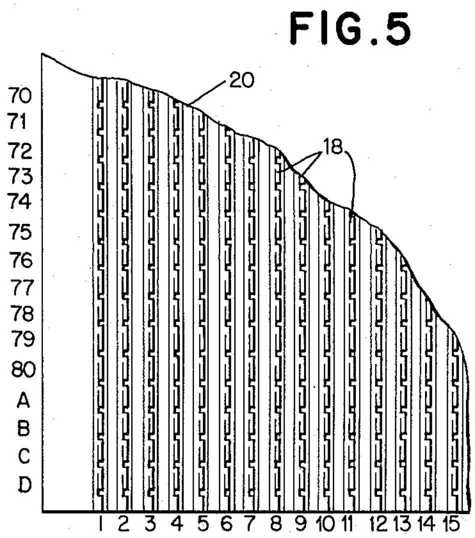
Fig. 6 is a plan view of a portion of one of the movable plates removed from the control panel.
Figure 3:
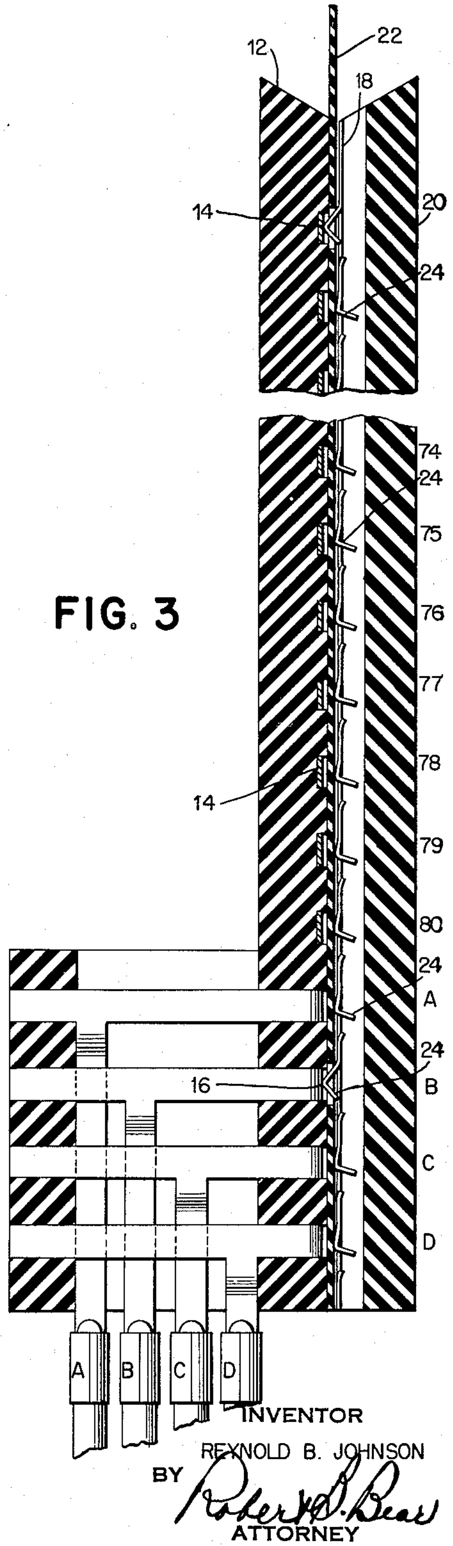
Fig. 3 is a partial side elevation of one of the units of the automatic control panel of Fig. 1 in section taken along lines 3—3.

The vertical plate 20 (Fig. 6) is a non-conductor on which insulated spring wires 18 are mounted. The spring wires comprise along their length a series of mutually connected yieldingly resilient contact points 24 (Fig. 3). The plate 20 is completely removable from the brackets 26 of the panel, and it has no fixed connections when removed from the machine. The sole purpose of the vertical contact wires 18 is to jumper one horizontal bus bar terminal 14 to another horizontal bus bar terminal 14 on a panel 12. The interval between contact points 24 on the vertical wires 18 corresponds to the interval between adjacent horizontal bus bars 14 and between adjacent horizontal rows of insulated contact points 16 on the panel 12. The space between adjacent vertical tiers of insulated contact points 16 on each terminal panel 12 corresponds to the space between adjacent vertical wires 18 in each plate 20. Each plate 20 used in the apparatus may be identical and interchangeable with any other plate 20 according to this proposed form of the device.

Figure 5:
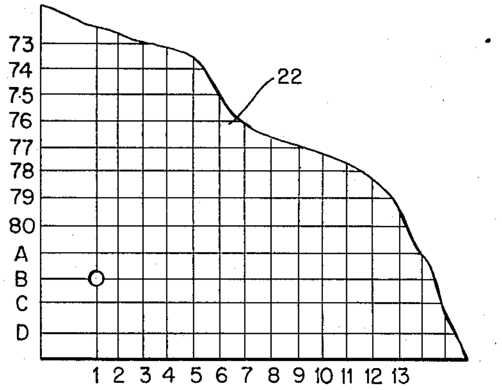
Fig. 5 is a plan view of a portion of one of the perforated insulating sheets removed from the operating position.

The insulating sheet 22 (Fig. 5) consists of an electrically non-conducting material (as for example, stiff insulating paper). Each insulating sheet 22 has imprinted on it a series of vertical lines equal in number to the vertical contact wires 18 in the plate 20 and a series of horizontal lines equal in number to the horizontal terminal bars 14 together with the horizontal rows of insulated contact points 16 on the control panel 12. The horizontal lines are so arranged on the insulating sheet that they will register in the operating position with corresponding horizontal bus bars on the panel 12 and with the horizontal position of each horizontal row of the insulated contact points on the panel, and the vertical lines imprinted on it will register with corresponding vertical wires on the plate 20. Selected spaced openings are perforated in the sheet. The size of these openings is large enough for one and only one yieldingly resilient contact point 24 on the vertical wires to pass through. These openings are made at intersections of horizontal and vertical lines and the spaced relationship of the openings determines the interconnections that will be made.

When the vertical plate 20 is inserted in the brackets 26 in operating position, the vertical wires 18 in the plate 20 are in crossed relationship with the horizontal bus bars 14 in the panel 12. The yieldingly resilient contact points 24 then bear against and make contact with the opposed horizontal bus bars 14 at the intersections of these elements with the vertical wires 18. The lower (in this case four) contact points 24 on each of the wires 18 in the vertical plate are adapted to contact and cooperate with the four corresponding insulated contact points 16 in the panel.

Each of the four insulated contact points 16 in a vertical tier of one control panel 12 is permanently connected by fixed wiring 28 to another insulated contact point 16 of the corresponding vertical tier of each of the three remaining panels 12. It is then possible to complete a circuit from one vertical contact wire 18 of plate 20 of unit II to the corresponding vertical contact wire 18 of plates 20 of units III or IV. The converse is also true. There may be instances, however, when permanent interconnecting wires 28 may not be provided between insulated contact terminals in one panel with corresponding insulated contact terminals in all of the other panels. For example, the upper and lower sensing brushes need never be interconnected by permanent wiring 28.

When an insulating sheet 22 is interposed in its operating position between the panel 12 and the vertical plate 20, the contact points 24 of the vertical plate yield to allow the sheet to enter and to be secured in operating position in the brackets 26. All of the contacts between opposing members of the plate 20 and panel 12 would then be broken by the interference of the sheet 22. If, however, perforations have been made at selected intersections of the horizontal and vertical lines on the insulating sheet 22, the yieldingly resilient contact points 24 in registry with such perforations spring back into normal relaxed position in contact with the opposed member on the panel 12.

Figure 7:
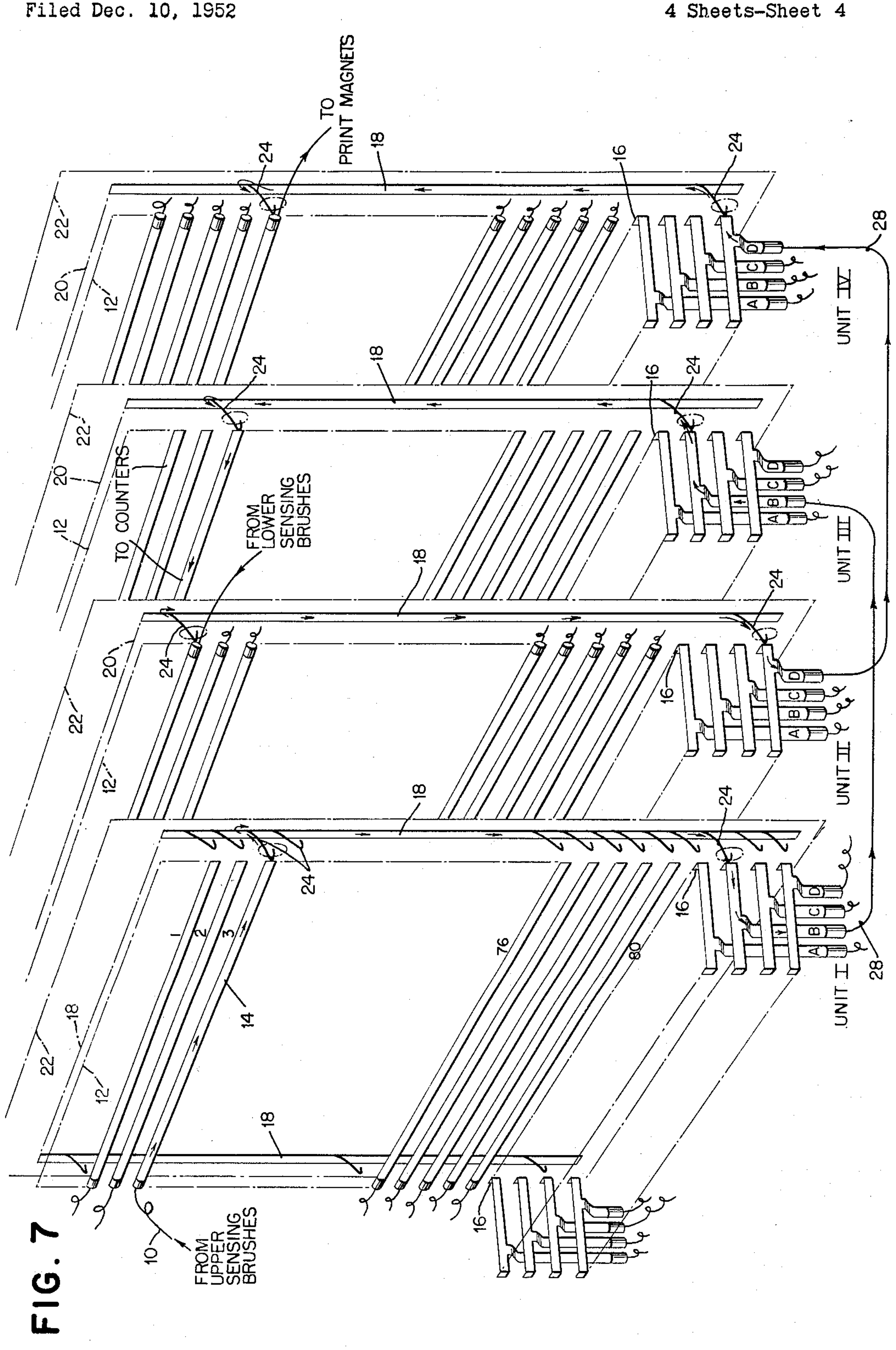
Fig. 7 is a partly diagrammatic isometric view of the proposed control panel.

Fig. 7 illustrates the manner in which internal and external connections are accomplished in the proposed embodiment. The permanent wires 10 from the various machine elements, that is from the upper brushes, lower brushes, counters and print magnets, are connected directly to individual horizontal bus bars 14 on the panels 12. Electrical connections between the units are made by wires 28 connected between terminals for the insulated contact points 16 on the panels 12. Illustrative connections are shown between the B terminals of the first vertical row on units I and III, and between the D terminals of the first vertical row on units II and IV. Similar banks of A, B, C and D terminals are provided in each vertical row of each unit, there being one bank of terminals on each panel 12 for every vertical wire 18 on the associated plate 20. Connections within any unit are completed through the vertical wires 18 on the plates 20 and the resilient contact points 24 on said wires 18. Thus by making two selected perforations in the insulating sheet 22 in any vertical row to allow one resilient contact point 24 to spring into contact with the opposing bus bar 14 on the panel 12 and another resilient contact point 24 on the same vertical wire 18 to spring into contact with the opposing insulated point contact 16 on the panel 12 a circuit will be completed through said vertical wire 18 from said bar 14 to said insulated point 16.

By way of example, the control panel of the present invention can cooperate on an accounting machine such as that described in U. S. Patent 2,042,324 isued to J. R. Peirce on May 26, 1936. Thus, to print with the fifth type bar 72 (see also Figs. 3, 8 and 12 of U. S. Patent 2,042,324) information sensed from the punched record card by the first lower sensing brush 63 (see also Figs. 6 and 25 of U. S. Patent 2,042,324), the selected position of the perforations required in the two insulating sheets involved and the corresponding circuits are determined in the following manner:

An opening is made in insulated sheet 12 of unit II at the intersections of horizontal line #1 and vertical line #1. It will be recalled that horizontal contact bar #1 of the control panel of unit II is permanently connected to the first lower sensing brush 63. The second such opening is made in the insulating sheet of unit II at the intersection of vertical line #1 and the horizontal line D which represents the row of insulated contact terminals of the control panel of unit II that are permanently wired to the corresponding contact terminals of the control panel of unit IV. Similarly, two openings are made in insulating sheet of unit IV; the first opening at the intersection of vertical line #1 and horizontal line D which is the horizontal line representing the row of insulated contact terminals of the control panel unit IV permanently connected to corresponding contact terminals on the control panel of unit II. The second opening is made in that insulating sheet at the intersection of vertical line #1 and horizontal line #5.

Figure 2:
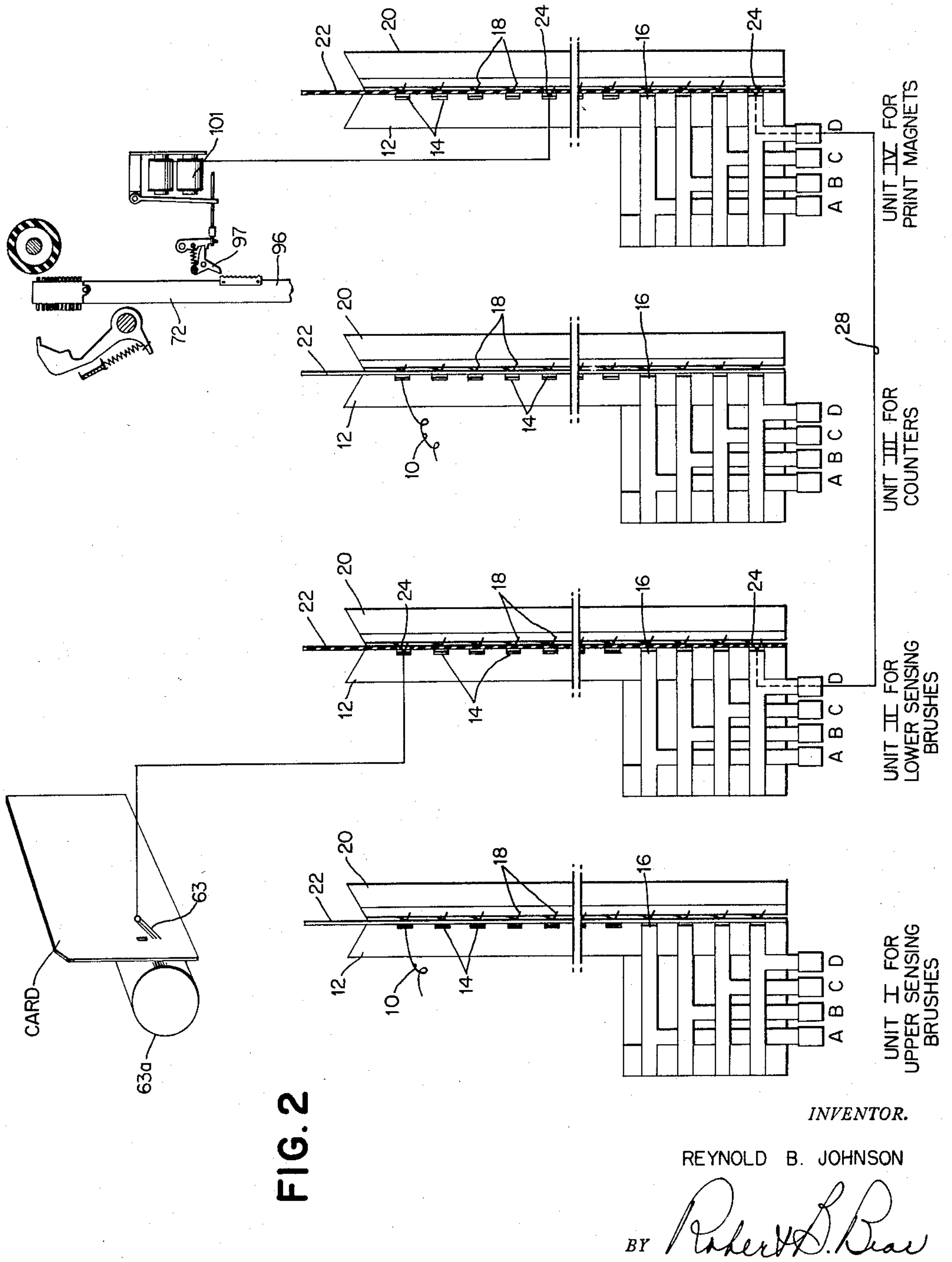
Fig. 2 is a schematic representation showing exploded four units of one automatic control panel cooperating to complete a selected circuit.
Figure 4:
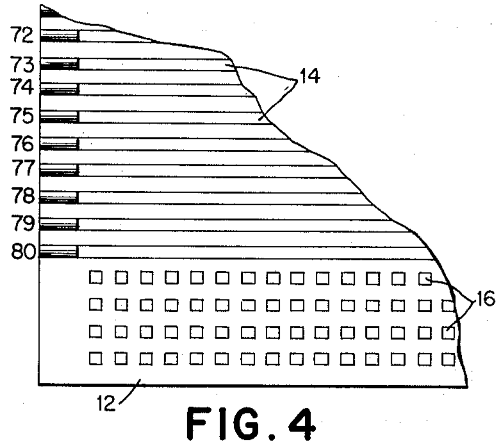
Fig. 4 is a plan view of a portion of one of the fixed terminal panels according to the invention.

Referring to Fig. 2, and starting at the first lower sensing brush 63, the circuit to list with the fifth type bar 72 information read by the first lower sensing brush 63 may be traced as follows:

From the contact roll 63*a* of the electric accounting machine through any opening in the first column of punched record card being sensed to the first lower sensing brush 63, and from there through permanent wiring 10 to the number one horizontal contact terminal bar 14 of the control panel 12 of unit II; from there to the vertical wire #1 of plate 20 of unit II by way of the first opening in insulating sheet #2; from there to the insulated contact point D–1 on control panel 12 of unit II by way of the second opening of insulating sheet 22 of unit II; from there by way of the permanent interconnecting wiring 28 to the corresponding insulated contact terminal D–1 in control panel 12 of unit IV; from there to vertical wire #1 of plate 20 of unit IV by way of the first opening in insulating sheet 22 of unit IV; from there to the fifth horizontal terminal bar 14 of control panel 12 of unit IV by way of the second opening in insulating sheet 22 of unit IV. Since the fifth horizontal terminal bar 14 of the control panel of unit IV is permanently wired to the fifth print magnet 101, the pulse received from the first lower sensing brush 63 will energize the fifth print magnet 101. Energizing magnet 101 actuates bell crank 97, causing it to engage the toothed member 96 of the fifth type bar 72 to stop the type bar in the position to print the character sensed by the first lower sensing brush 63.

In a similar way, other selected control panel setups are possible.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a control apparatus for electric accounting machines, a panel having a plurality of substantially parallel rows of commonly connected input terminals and of individual insulated output terminals, a plate opposed to said panel, said plate having a plurality of substantially parallel individual insulated wires in cross relationship with said rows of terminals on said panel, a series of resilient contact points on each of said wires at the intersections of the wires with said rows of terminals, said contact points being insulated from said terminals by an interposed perforated insulating sheet, but biased to extend through selective perforations in said insulating sheet and contact against the opposing terminals to effect interconnection between input and output terminals on the panel contacted by contact points on the same wire on said plate.

2. In a control apparatus for electric accounting machines, a panel having a plurality of horizontal bar input terminals, and a plurality of vertical rows of individual insulated output terminals, a plate opposed to said panel, said plate having a plurality of individual insulated vertical wires in cross relationship with said horizontal input terminals and in alignment with said rows of individual output terminals, a series of resilient contact points on each of said wires at the intersections of the wires with the horizontal input terminals, and opposite the individual output terminals in the corresponding vertical row, said contact points being insulated from said terminals by an interposed perforated insulating sheet, but biased to extend through selective perforations in said insulating sheet and contact against the opposing terminals to effect interconnection between any input and output terminals on said panel contacted by contacts on the same wire on said plate.

3. In a control apparatus for electric accounting machines, a frame, a number of panels mounted in said frame, a plurality of horizontal bus bars on each panel, a number of plates mounted in said frame each opposed to an associated one of said panels, a plurality of individual vertical wires on each plate, a series of resilient contact points on each of said vertical wires at the intersections of said wire with said horizontal bus bars, said contact points being normally insulated from the associated bus bars by an interposed insulating sheet, but biased to contact against said bus bars through selective perforations in said sheet to effect selective interconnection between bus bars on a panel and vertical wires on an associated plate, and connecting wires between vertical wires on different plates to effect interconnections between horizontal bus bars on different panels according to the perforations in the associated insulating sheets.

4. In a control apparatus for electric accounting machines a frame, a number of panels mounted in said frame, a plurality of horizontal bus bar control terminals on each panel, a plurality of vertical rows of individual transfer terminals on each panel, a number of plates in said frame each opposed to an associated one of said panels, a plurality of vertical wires on each plate, a series of resilient contact points on each vertical wire at the intersections of said wire with said horizontal control terminals and opposite individual transfer terminals in the corresponding vertical row on said panel, said contact points being normally insulated from the associated control and transfer terminals by an interposed insulating sheet but biased to contact against said control and transfer terminals through selective perforations in said sheet to effect selective interconnection between control and transfer terminals on the associated plate, and interconnecting wires between individual transfer terminals on different panels to effect interconnection between selective horizontal control terminals on different panels according to the perforations in the associated insulating sheets.

References Cited in the file of this patent

UNITED STATES PATENTS

| | | |
|---|---|---|
| 1,242,861 | Pruitt | Oct. 9, 1917 |
| 2,056,361 | Mills | Oct. 6, 1936 |
| 2,293,127 | Fishack | Aug. 18, 1942 |
| 2,493,858 | Carroll | Jan. 10, 1950 |